United States Patent [19]
Kuriyama

[11] Patent Number: 6,125,452
[45] Date of Patent: *Sep. 26, 2000

[54] TERMINAL UNIT FOR IC CARD USING PLURAL PROTOCOLS AND CONTROL METHOD THEREFOR

[75] Inventor: Ryouichi Kuriyama, Zushi, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/016,405

[22] Filed: Jan. 30, 1998

[30] Foreign Application Priority Data

Jan. 30, 1997 [JP] Japan ..................................... 9-016948

[51] Int. Cl.[7] .................................................. G06K 19/06
[52] U.S. Cl. ............................................ 713/600; 235/492
[58] Field of Search .................................. 713/400, 600; 235/380, 492

[56] References Cited

U.S. PATENT DOCUMENTS

| | | |
|---|---|---|
| 4,692,640 | 9/1987 | Suzuki et al. |
| 4,816,656 | 3/1989 | Nakano et al. ........................... 235/380 |
| 5,434,395 | 7/1995 | Storck et al. ............................ 235/380 |
| 5,682,027 | 10/1997 | Bertina et al. .......................... 235/380 |

FOREIGN PATENT DOCUMENTS

95/04328  2/1995  WIPO .

Primary Examiner—Thomas M. Heckler
Attorney, Agent, or Firm—Pillsbury Madison & Sutro

[57] ABSTRACT

A data processing apparatus for IC card media. The data processing apparatus has a function for holding one of the portable media and supplying a clock signal to the held medium for the purpose of establishing communication with the portable medium in the synchronous communication protocol, a function for determining whether the held medium uses the synchronous communication protocol or the asynchronous communication protocol in accordance with data transmitted from the held medium in response to the clock signal, a function for continuing a subsequent communication with the held medium in the synchronous communication protocol when a determination has been made that the synchronous communication protocol is used, and a function for supplying a clock signal to the held medium of the purpose of establishing communication with the portable medium in the asynchronous communication protocol when a determination has been made that the asynchronous communication protocol is used.

19 Claims, 5 Drawing Sheets

TERMINAL UNIT FOR IC CARD USING PLURAL PROTOCOLS AND CONTROL METHOD THEREFOR

BACKGROUND OF THE INVENTION

The present invention relates to a terminal unit and a control method for an IC card which is capable of reading various trading data and data regarding an amount of money from the IC card serving as a credit card or as electronic money and a control method therefor.

IC cards are used to serve as portable storage mediums each comprising a nonvolatile memory and an IC chip for controlling the nonvolatile memory.

When an IC card of the foregoing type is used as a credit card or electronic money, it is a convenient fact that various trading data or data about an amount of money can be read by a user of the IC card as necessary.

To meet the above-mentioned requirement, a portable terminal unit for an IC card (including a desktop type terminal unit, as well as the portable type terminal unit) is known which permits a user to always carry the terminal unit. The foregoing terminal unit is formed into a card-like shape similar to the IC card and comprising a keyboard, a liquid crystal display section and a battery. When an IC card is inserted into the terminal unit, various trading data or data about an amount of money is read from the IC card in response to the operation of the keyboard. Then, the terminal unit displays read data on the liquid crystal display section thereof.

IC cards include IC cards of a type comprising a CPU and having a structure adapted to an asynchronous protocol so that data is transmitted in response to supply of a clock and a command from outside. Moreover, the IC cards include IC cards of a type having no CPU and arranged in such a manner as to serially transmit data in synchronization with supply of a clock signal from outside.

A process for reading data from the IC card adapted to the asynchronous protocol and that from the IC card adapted to the synchronous protocol are different from each other. Therefore, there arises a problem in that plural types of terminal units for IC cards must be prepared to be adaptable to the above-mentioned types of the protocols.

BRIEF SUMMARY OF THE INVENTION

An object of the present invention is to provide a terminal unit for IC cards which is capable of processing data of both of an asynchronous communication protocol type IC card and a synchronous communication protocol type IC card and which exhibits satisfactory flexibility and a method of controlling the terminal unit for IC cards.

According to one aspect of the present invention, there is provided a data processing apparatus for receiving portable media, the apparatus communicates with the portable media in a synchronous communication apparatus and an asynchronous communication protocol, comprising: first supply means (15, 16, S104) for holding one of the portable media and supplying a first clock signal to the held medium for the purpose of establishing communication with the portable medium in the synchronous communication protocol; means (11, S105, S106, S117, S107, S108, S113, S109) for determining whether the held medium uses the synchronous communication protocol or the asynchronous communication protocol in accordance with data transmitted from the held medium in response to the first clock signal; means (11, S110, S111) for continuing a subsequent communication with the held medium in the synchronous communication protocol when the determining means has determined that the portable medium uses the synchronous communication protocol; and second supply means (11, S114, S115, S116, S118) for supplying a second clock signal to the held medium for the purpose of establishing communication with the portable medium in the asynchronous communication protocol when the determining means has determined that the portable medium uses the asynchronous communication protocol.

The present invention having the above-mentioned structure is able to eliminate a necessity of preparing an exclusive terminal unit for the synchronous communication protocol and for the asynchronous protocol. That is, only when the IC medium is inserted into the terminal unit, a clock signal is supplied on the assumption that the protocol is the synchronous protocol regardless of the protocol. Then, a signal is read from the IC medium in response to the supplied clock signal. Then, the protocol of the inserted IC card is determined in accordance with the read signal so that a proper communication protocol is automatically selected. As a result, one terminal unit is able to process portable media of both protocol types.

Also a method of controlling the portable media permits only one terminal unit to automatically determine the protocol to realize the required process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to the drawings.

Figure 1:
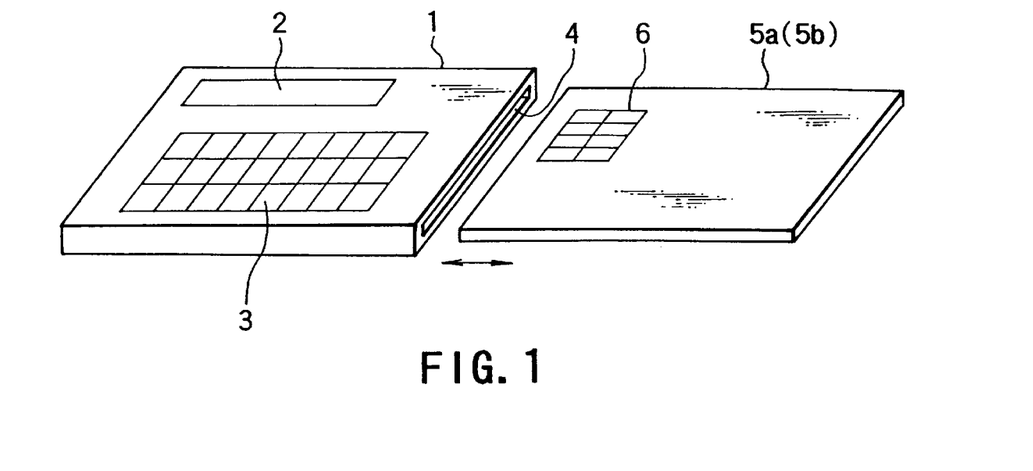
FIG. 1 is a perspective view showing the shape of a first embodiment and an IC card.

Referring to FIG. 1, reference numeral 1 represents a body of a terminal unit for an IC card, the body 1 being formed into a card-like shape having a liquid crystal display section 2 and a keyboard 3 on the upper surface thereof. The liquid crystal display section 2 is a section on which various data is displayed. The keyboard 3 serves as a means for inputting a password and other data.

A card insertion opening 4 is formed in the side surface of the body 1 to permit insertion of the IC card 5a (5b).

The IC card 5a (5b) serves as a credit card, a point cumulative medium or a prepaid card and having a contact section 6 formed at a predetermined position on either of the surfaces thereof. The contact section 6 establishes the electrical connection between the body 1 and the IC card 5a (5b) and comprises a plurality of terminals including a power supply terminal, a reset terminal, a clock terminal and an input/output (I/O) terminal.

Figure 2:
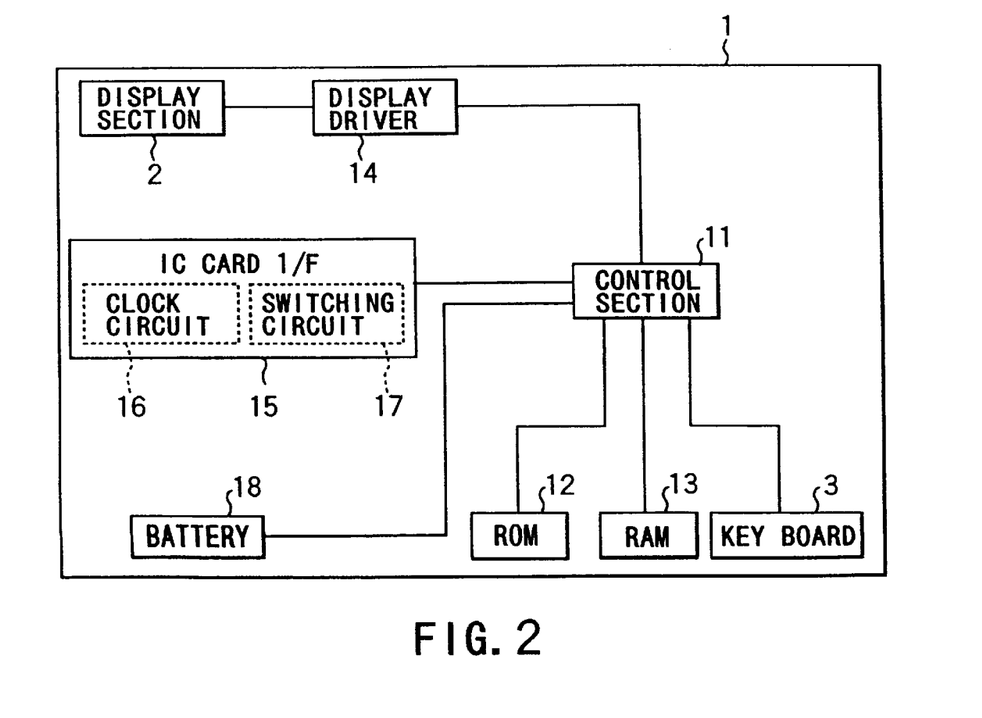
FIG. 2 is a block diagram showing a control circuit according to the first embodiment.

FIG. 2 shows a control circuit in the body 1, the control circuit having a control section 11 for controlling the overall body of the apparatus. A keyboard 3, a ROM (Read Only Memory) 12, a RAM (Random Access Memory) 13, a display driver 14, an IC-card interface (I/F) 15 and a battery 18 are connected to the control section 11.

The control section 11 includes a CPU and a power supply circuit. The power supply circuit receives the voltage (for example, 3 V) of the battery 18, and then converts the voltage into operation voltage for the control section 11 and for the IC card. The operation voltage (for example, 5 V) for the IC card is supplied to the IC-card interface 15.

The ROM 12 has control program stored thereon. The RAM 13 serves as a work memory. The display driver 14 operates the liquid crystal display section 2.

The IC-card interface 15 establishes the connection with the IC card 5a (5b) and makes an access to the same. The IC-card interface 15 has a clock circuit 16 and a switching circuit 17. The clock circuit 16 transmits a clock signal having a predetermined frequency. The switching circuit 17 selectively switches the frequency of the clock signal generated by the clock section 16 into either of a frequency of 3.5 MHz for operating (for reading data from) the IC card adapted to the asynchronous protocol or a frequency of 10 KHz for operating (for reading data from) the IC card adapted to the synchronous protocol. The frequency of 10 KHz is generated by the operation of the control section 11 for controlling the frequency of 3.5 MHz.

Figure 3:
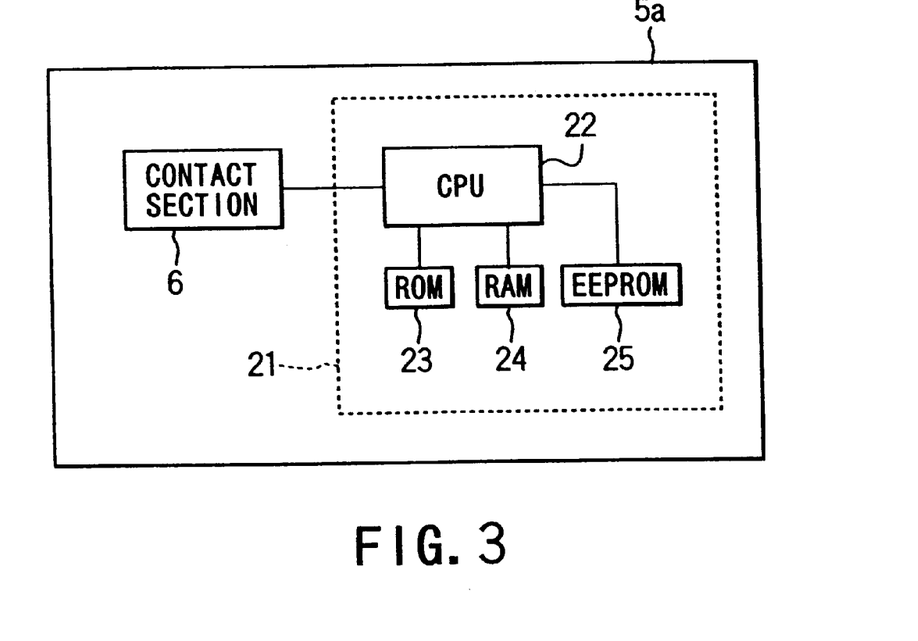
FIG. 3 is a block diagram showing a control circuit in an IC card adapted to an asynchronous communication protocol.

On the other hand, the IC card 5a is an IC card (hereinafter called an "asynchronous protocol type IC card") having a CPU and adapted to the asynchronous protocol for transmitting data in response to supply of a clock signal and a command from outside. As shown in FIG. 3, the IC card 5a is formed by a contact section 6 and an IC chip 21.

The IC chip 21 comprises a CPU 22, a ROM 23 having a control program stored thereon, a RAM 24 serving as a work memory and an EEPROM 25 which is a nonvolatile memory on which data is stored.

In addition, to the asynchronous protocol type IC card 5a, an IC card 5b is prepared.

Figure 4:
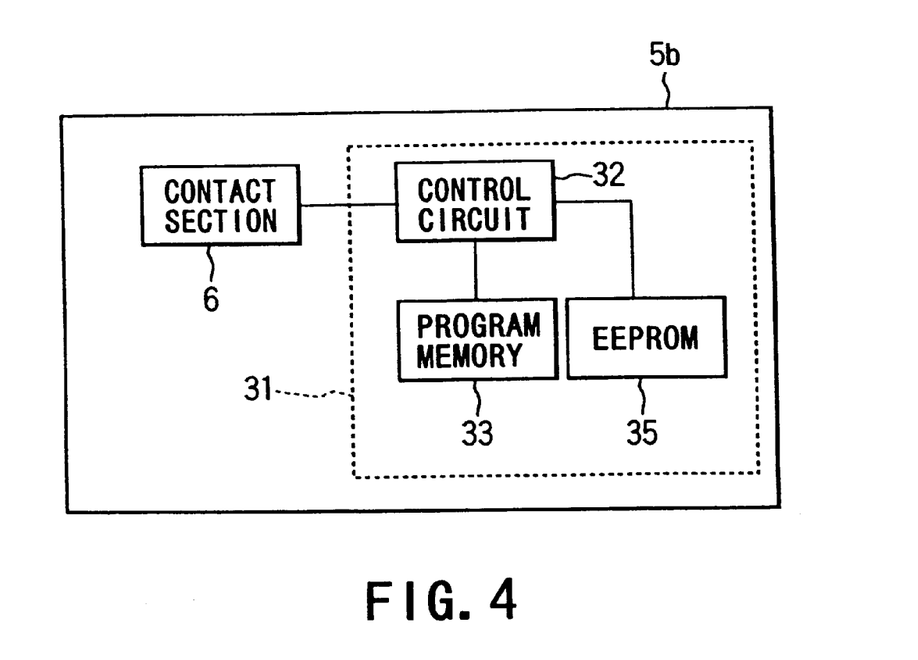
FIG. 4 is a block diagram showing a control circuit in an IC card adapted to a synchronous communication protocol.

The IC card 5b is an IC card (hereinafter called a "synchronous protocol type IC card") having no CPU and adapted to the synchronous protocol for serially transmitting data one by one in synchronization with a clock signal supplied from outside. The IC card 5b comprises a contact section 6 and a IC chip 31, as shown in FIG. 4.

The IC chip 31 comprises a control circuit 32, a program memory 33 and an EEPROM 35 which is a nonvolatile memory on which data is stored.

The control section 11 of the body 1 of a system comprising the terminal unit for the IC card and the IC cards of the foregoing type has the following functional means.

(1) A first reading means for supplying, to the IC card (5a or 5b) inserted into the card insertion opening 4, a clock signal for operation (for reading data), a reset signal and operation power supply voltage for the IC card 5b.

(2) A determining means for determining that the inserted IC card is the asynchronous protocol type IC card 5a or the synchronous protocol type IC card 5b in accordance with data read by the first reading means.

(3) A control means for continuing the process which has been performed by the first reading means if a result of determination made by the determining means is the synchronous protocol type IC card 5b.

(4) A second reading means for supplying, to the inserted IC card 5a, a clock signal for operation (for reading data), a reset signal and an operation power supply voltage for the asynchronous protocol type IC card 5a if a result of determination made by the determining means is the asynchronous protocol type IC card 5a.

(5) A control means for displaying data read by the first reading means or the second reading means on the liquid crystal display section 2.

The operation of the above-mentioned structure will now be described with reference to a flow chart shown in FIGS. 5A and 5B and a time chart shown in FIGS. 6 and 7.

Figure 5A:
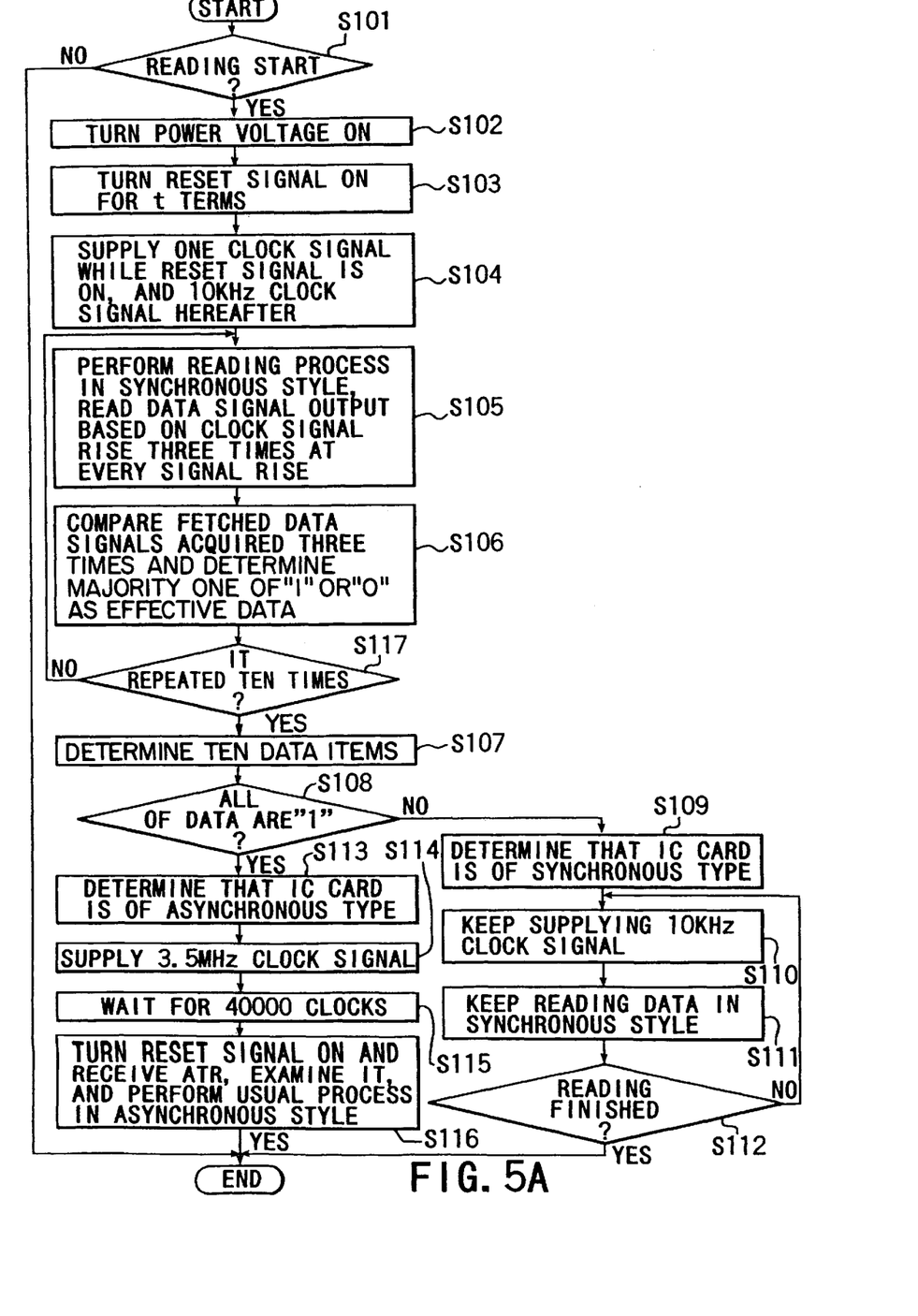
FIG. 5A is a flow chart showing the operation of the first embodiment.

Referring to FIG. 5A, when either of the IC card 5a or the IC card 5b is inserted into the card insertion opening 4 and a reading data is instructed by using the keyboard 3 (YES in step S101), power source voltage VCC is supplied to the inserted IC card (step S102).

A reset signal RST, which is turned on (the level of which is raised to a high level) for a predetermined period of time, is supplied to the inserted IC card (step S103). Then, one clock signal CLK is supplied during the period in which the reset signal RST is turned on. Then, clock signals CLK each having a frequency of 10 KHz are supplied (step S104).

When the reset signal RST and clock signal CLK have been supplied, a process for reading data from the synchronous protocol type IC card 5b is performed. A data signal is read from the inserted IC card at each rising edge of the clock signal CLK so that read data for each bit is fetched three times (or odd-number times) (step S105).

Figure 6:
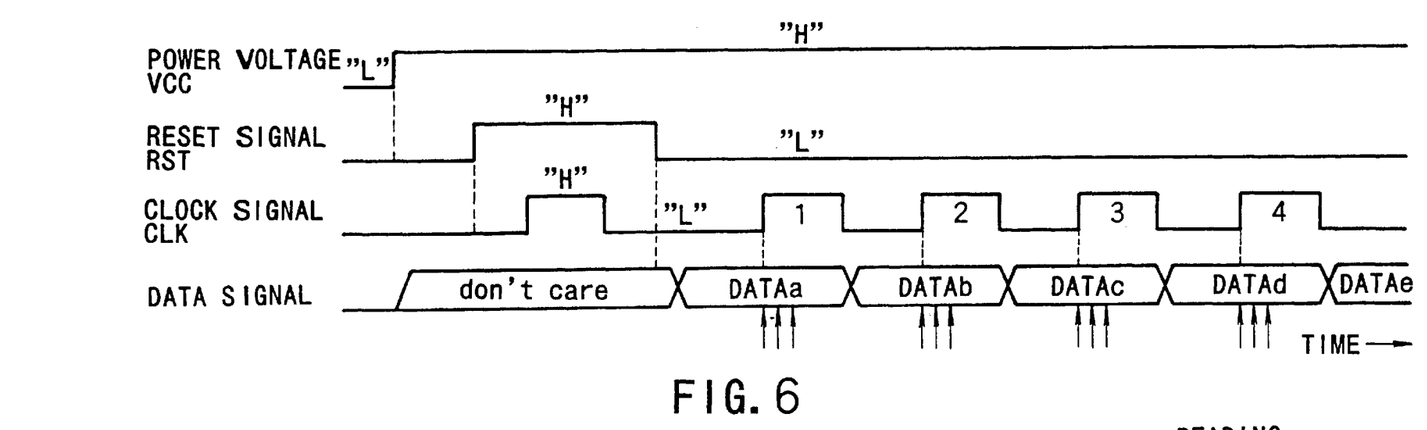
FIG. 6 is a time chart showing the operation of the other embodiment.
Figure 7:
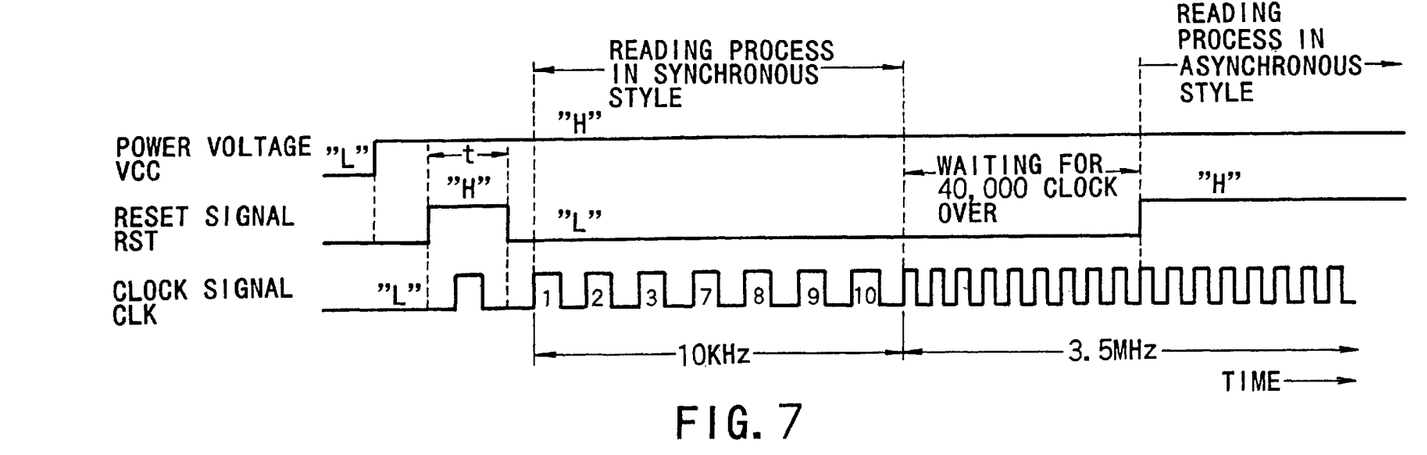
FIG. 7 is a time chart showing a synchronous protocol type reading process according to the other embodiment.

If the inserted IC card is the synchronous protocol type IC card 5b having no CPU, data in the synchronous protocol type IC card 5b for each bit is serially read at the rising edge of the clock signal CLK having the frequency of 10 KHz, as shown in the time chart shown in FIG. 6. That is, data a is read in synchronization with the first rising edge of the clock signal CLK. Data b is read in synchronization with the second rising edge of the clock signal CLK. Data c is read in synchronization with the third rising edge of the clock signal CLK. As described above, data is sequentially read. Timing when data is fetched for each bit is indicated by an arrow. Thus, fetching is performed three times for each of data a, b, c, d, . . . .

Three data items for each of the fetched bits are compared with one another. The contents of read data are determined for each bit on the basis of the contents of majority data. That is, "1" or "0" having a higher number of occurrences of the three data items is determined as the effective data (step S106).

As described above, data is fetched three times for each bit to determine data. Thus, improper reading because of noise or the like can be prevented. Note that the number of fetching times is not limited to three times and appropriate odd number of times, for example, five times or seven times, may be employed if the majority and minority can be generated.

Determined effective data is displayed on the liquid crystal display section 2.

The above-mentioned process is repeated until a predetermined number of, for example, 10 bits is obtained from determined effective data (steps S107 and S117) to determine whether or not the content is the common "1" (step S108).

If the inserted IC card is the synchronous protocol type IC card 5b having no CPU, serial data output for each bit is sequentially performed. Therefore, data of 10 bits is in the form in which "1" and "0" are arbitrarily mixed with one another. When the foregoing state is realized, the card has no data.

Figure 5B:
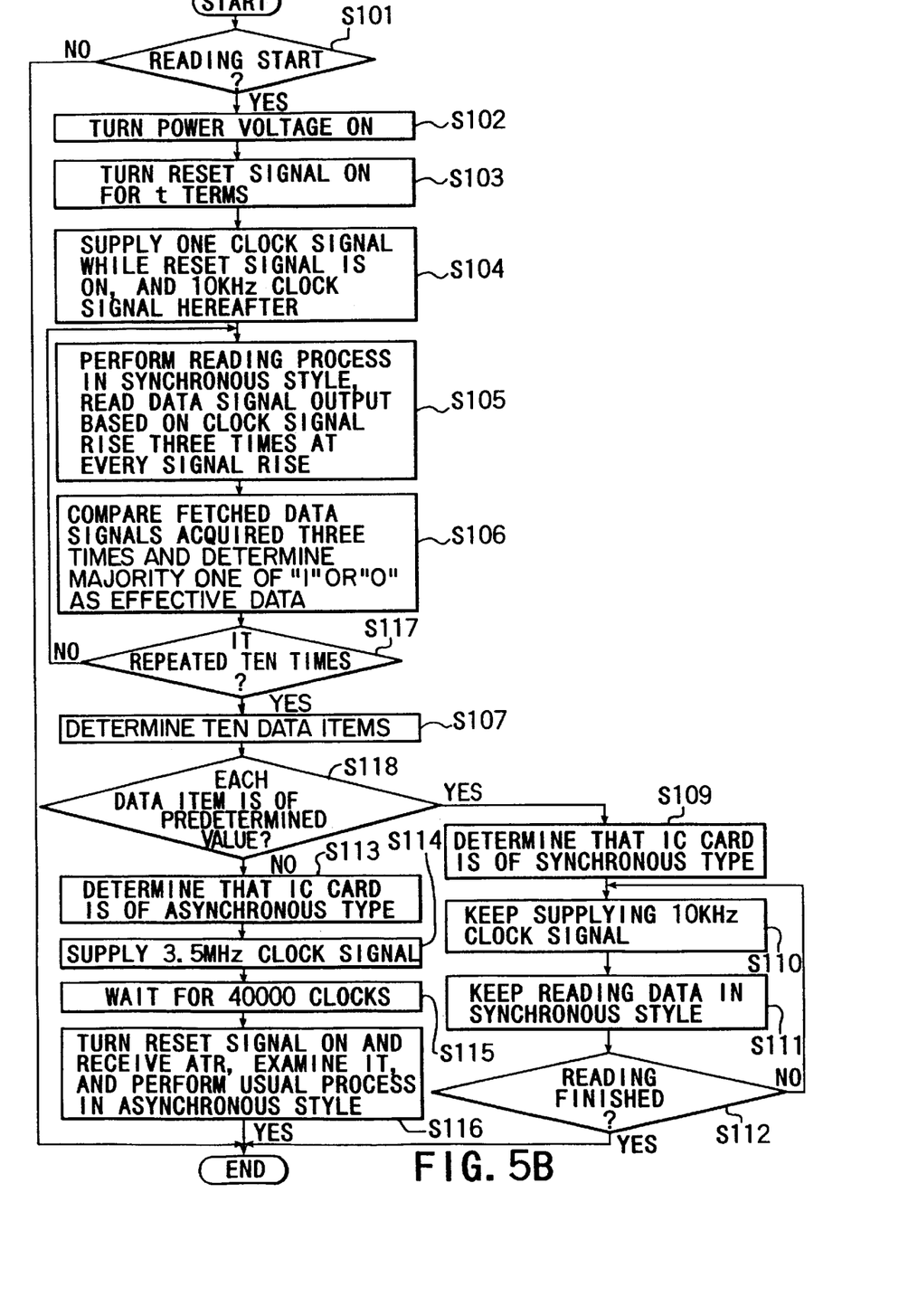
FIG. 5B is a flow chart showing the operation of another embodiment.

FIG. 5B shows another example for determining whether the IC card is a synchronous protocol type card or an asynchronous protocol type card. Since the other steps shown in FIG. 5B are the same as those shown in FIG. 5A, the same steps are omitted from description. In step S118, if the signal obtained from the IC card is determined to be regulated as a signal which is first transmitted from a synchronous protocol type IC card, a determination can be made that the inserted IC card is the synchronous protocol type IC card without a necessity of performing the determination shown in FIG. 5A (step S118).

If the inserted IC card is the asynchronous protocol type IC card 5a having a CPU, the IC card transmits data in response to only a command supplied from outside. Therefore, ten data items are formed in such a manner that "1" successively appears in place of the original form.

If the contents of ten data items are not common "1" (NO in step S108), a determination is made that the IC card inserted into the card insertion opening 4 is the synchronous protocol type IC card 5b (step S109).

When a result of determination has been made that the inserted card is the synchronous protocol type IC card 5b, supply of clock signals CLK each having the frequency of 10 KHz is continued (step S110). Thus, a process of reading data from the synchronous protocol type IC card 5b is continued until completion of the reading process is instructed by using the keyboard 3 (steps S111 and S112).

If the contents of ten data items are common "1" (YES in step S108), a determination is made that the IC card inserted into the card insertion opening 4 is the asynchronous protocol type IC card 5a (step S113).

In the foregoing case, the clock signal CLK which must be supplied is switched from 10 KHz for the synchronous protocol type IC card to 3.5 MHz for the asynchronous protocol type IC card (step S114). Then, a waiting process is performed for a period of time which corresponds to 40,000 clocks determined on the basis of the clock signal CLK having the frequency of 3.5 MHz (step S115). Then reset signal RST which is always turned on (the level of which is a high level) is supplied. At this time, ATR is received from the IC card. The ATR is determined, and then a usual process (the reading process or the like) for the asynchronous protocol type IC card is performed (step S116). The waiting process which is performed for the period of type corresponding to 40,000 clocks is regulated by ISO.

The process for reading data from the asynchronous protocol type IC card 5a causes an output of data to be made in response to only supply of a command by using the keyboard 3. The output data is displayed on the liquid crystal display section 2.

As described above, whether the IC card inserted into the card insertion opening 4 is the asynchronous protocol type IC card 5a or the synchronous protocol type IC card 5b is automatically determined. Moreover, a reading process adaptable to a result of determination is automatically performed. As a result, data can be read from both of the asynchronous protocol type IC card 5a and the synchronous protocol type IC card 5b. Thus, satisfactory flexibility can be realized.

The synchronous type reading process, which is started in response to supply of the reset signal RST and the clock signal CLK, is initially performed. In accordance with data read in the synchronous type reading process, the IC card is determined. The asynchronous type reading process in which the waiting process for the period of time corresponding to 40,000 clocks regulated by ISO is performed to correspond to a result of determination of the IC card. Therefore, time required to determine the IC card, that is, time required to obtain read data can be satisfactorily shortened. Thus, the convenience for a user can be improved.

Although the invention has been described in its preferred form, it is understood that the present disclosure of the preferred form can be changed without departing from the scope of the invention.

Although the embodiment has been described about the portable terminal unit, the present invention may be applied to a desktop type terminal unit.

As described above, the terminal unit for IC cards according to the present invention is arranged in such a manner that a determination is made whether the inserted IC card is the asynchronous protocol type IC card or the synchronous protocol type IC card. Moreover, the reading process is performed to be adaptable to a result of determination. As a result, the terminal unit for IC cards exhibiting satisfactory flexibility can be provided which is capable of processing data of both of the asynchronous protocol type IC card and the synchronous protocol type IC card.

The method of controlling the terminal unit for IC cards according to the present invention is arranged in such a manner that a determination is made whether the inserted IC card is the asynchronous protocol type IC card or the synchronous protocol type IC card. Moreover, the reading process is performed to be adaptable to a result of determination. As a result, the method of controlling the terminal unit for IC cards exhibiting satisfactory flexibility can be provided which is capable of processing data of both of the asynchronous protocol type IC card and the synchronous protocol type IC card.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A data processing apparatus for IC media, the apparatus being constructed and arranged to communicate with the IC medium in a synchronous communication protocol and an asynchronous communication protocol, comprising:

first supplying means for supplying a first clock signal to an IC medium of the IC media for establishing communication with the IC medium using the synchronous communication protocol;

means for receiving data outputted from the IC medium in synchronism with the first clock signal supplied by the first supplying means;

means for determining whether the IC medium uses the synchronous communication protocol or the asynchronous communication protocol, based on whether or not the received data has a predetermined value;

means for continuing a subsequent communication with the IC medium in the synchronous communication protocol when the determining means has determined that the IC medium uses the synchronous communication protocol; and second supply means for supplying a second clock signal, having a higher frequency than the first clock signal, to the IC medium for establishing communication with the IC medium using the asynchronous communication protocol when the determining means has determined that the IC medium uses the asynchronous communication protocol.

2. A data processing apparatus according to claim 1, wherein the determining means comprises:

means for reading the data from the IC medium to display contents of the read data.

3. A data processing apparatus according to claim 1, wherein the first supply means comprises:

means for supplying, to the IC medium, a reset signal and a power source voltage, the power source voltage being for operating the IC medium.

4. A data processing apparatus according to claim 1, wherein the determining means comprises:

means for reading the data transmitted from the IC medium in response to a rising of the first clock signal or a predetermined timing and determining effective data by majority data; and means for determining that the IC medium uses the synchronous communication protocol or the asynchronous communication protocol in accordance with a value of the effective data.

5. A data processing forming apparatus according to claim 1, wherein the determining means comprises:

means for reading the data transmitted from the IC medium in response to a rising of the first clock signal or a predetermined timing by performing a plurality of reading operations an odd-number of times and determining effective data by majority data; and means for determining that the IC medium uses the synchronous communication protocol or the asynchronous communication protocol in accordance with a value of the effective data.

6. A data processing apparatus according to claim 1, wherein the determining means comprises:

means for reading the data transmitted from the held IC medium in response to a rising of the first clock signal or a predetermined timing by performing a plurality of reading operations an odd-number of times and determining effective data by majority data; and means for repeating an operation of the determining means a plurality of times to determine whether the IC medium uses the synchronous communication protocol or the asynchronous communication protocol in accordance with a plurality of the determined effective data items.

7. A data processing apparatus according to claim 1, wherein the determining means comprises:

means for reading the data transmitted from the IC medium in response to a rising of the first clock signal or a predetermined timing and determining effective data by majority data; and means for determining that the IC medium uses the synchronous communication protocol when a plurality of effective data items are not common data and for determining that the IC medium uses the asynchronous communication protocol when the plurality of effective data items are common data.

8. A data processing apparatus according to claim 1, wherein the determining means comprises:

means for reading the data transmitted from the IC medium in response to a rising of the first clock signal or a predetermined timing and determining effective data by majority data; and means for determining that the IC medium uses the asynchronous communication protocol when all of a plurality of effective data items have a value of 1 and for determining that the IC medium uses the synchronous communication protocol when all of the plurality of effective data items have a value not equal to 1.

9. A data processing apparatus according to claim 1, wherein the determining means comprises:

means for reading the data transmitted from the IC medium in response to a rising of the first clock signal or a predetermined timing and determining effective data by a majority data; and means for determining that the IC medium uses the asynchronous communication protocol when all of a plurality of effective data items are not signals which are transmitted from the IC medium using the synchronous communication protocol and for determining that IC medium uses the synchronous communication protocol when all of the plurality of effective data items are signals which are transmitted from the IC medium using the synchronous communication protocol.

10. A method of controlling a data processing apparatus for IC media, the apparatus being constructed and arranged to communicate with an IC medium of the IC media in a synchronous communication protocol and an asynchronous communication protocol, the method comprising:

supplying a first clock signal to the IC medium for establishing communication with the IC medium using the synchronous communication protocol;

receiving data outputted from the IC medium in synchronism with the first clock signal supplied by the step of supplying the first clock signal;

determining whether the IC medium uses the synchronous communication protocol or the asynchronous communication protocol, based on whether or not the received data has a predetermined value;

continuing a subsequent communication with the IC medium using the synchronous communication protocol when the determining step has determined that the IC medium uses the synchronous communication protocol; and supplying a second clock signal, having a higher frequency than the first clock signal to the IC medium for establishing communication with the IC medium using the asynchronous communication protocol when the determining step has determined that the IC medium uses the asynchronous communication protocol.

11. A method according to claim 10, wherein the determination step comprises:

reading the data from the IC medium to display contents of the read data.

12. A method according to claim 10, wherein the step of supplying the first clock signal comprises:

supplying, to the IC medium, a reset signal and a power source voltage, the power source voltage being for operating the IC medium.

13. A method according to claim 10, wherein the determination step comprises:

reading the data transmitted from the IC medium in response to a rising of the first clock signal or a predetermined timing and determining effective data by majority data; and determining that the IC medium uses the synchronous communication protocol or the asynchronous communication protocol in accordance with a value of the effective data.

14. A method according to claim 10, wherein the determination step comprises:

reading the data transmitted from the IC medium in response to a rising of the first clock signal or a predetermined timing by performing a plurality of reading operations an odd-number of times and determining effective data by majority data; and determining that the IC medium uses the synchronous communication protocol or the asynchronous communication protocol in accordance with a value of the effective data.

15. A method according to claim 10, wherein the determination step comprises:

reading the data transmitted from the IC medium in response to a rising of the first clock signal or a predetermined timing by performing a plurality of reading operations an odd-number of times and determining effective data by majority data; and repeating an operation of the determining means a plurality of times to determine whether the IC medium uses the synchronous communication protocol or the asynchronous communication protocol in accordance with a plurality of the determined effective data items.

16. A method according to claim 10, wherein the determination step comprises:

reading the data transmitted from the IC medium in response to a rising of the first clock signal or a predetermined timing by performing a plurality reading operations to determine a plurality of effective data by majority data; and determining that the IC medium uses the synchronous communication protocol when the plurality of effective data are not common data and determining that the IC medium uses the asynchronous communication protocol when the plurality of effective data are common data.

17. A method according to claim 10, wherein the determination step comprises:

reading the data transmitted from the IC medium in response to a rising of the first clock signal or a predetermined timing and determining a plurality of effective data; and determining that the IC medium uses the asynchronous communication protocol when all of the plurality of effective data have a value of 1 and determining that the IC medium uses the synchronous communication protocol when all of the plurality of effective data items have a value not equal to 1.

18. A method according to claim 10, wherein the determination step comprises:

reading the data transmitted from the IC medium in response to a rising of the first clock signal or a predetermined timing and determining a plurality of effective data by a majority data; and determining that the IC medium uses the asynchronous communication protocol when all of the plurality or effective data are not signals which are transmitted from the IC medium using the synchronous communication protocol and determining that the IC medium uses the synchronous communication protocol when all of the plurality of effective data are signals which are transmitted from IC medium using the synchronous communication protocol.

19. A data processing apparatus for IC media, the apparatus being constructed and arranged to communicate with the IC media in a synchronous communication protocol and an asynchronous communication protocol, comprising:

a clock circuit arranged to transmit a clock signal at a predetermined frequency;

a switching circuit arranged to receive the clock signal and shift a frequency of the clock signal from the predetermined frequency to one of a first frequency and a second frequency, the clock signal having the first frequency being supplied to the IC medium of the IC media for establishing communication with the IC medium using the synchronous communication protocol, and the clock signal having the second frequency being supplied to the IC medium for establishing communication with the IC medium using the asynchronous communication protocol;

means for receiving data outputted from the IC medium in synchronism with the first clock signal supplied by the first supplying means; and means for determining whether the IC medium uses the synchronous communication protocol or the asynchronous communication protocol, based on whether or not the received data has a predetermined value, wherein the second frequency is a higher frequency than the first frequency.

* * * * *